March 28, 1950  R. L. MALCOM  2,502,162
GOGGLE ASSEMBLY
Filed June 20, 1947
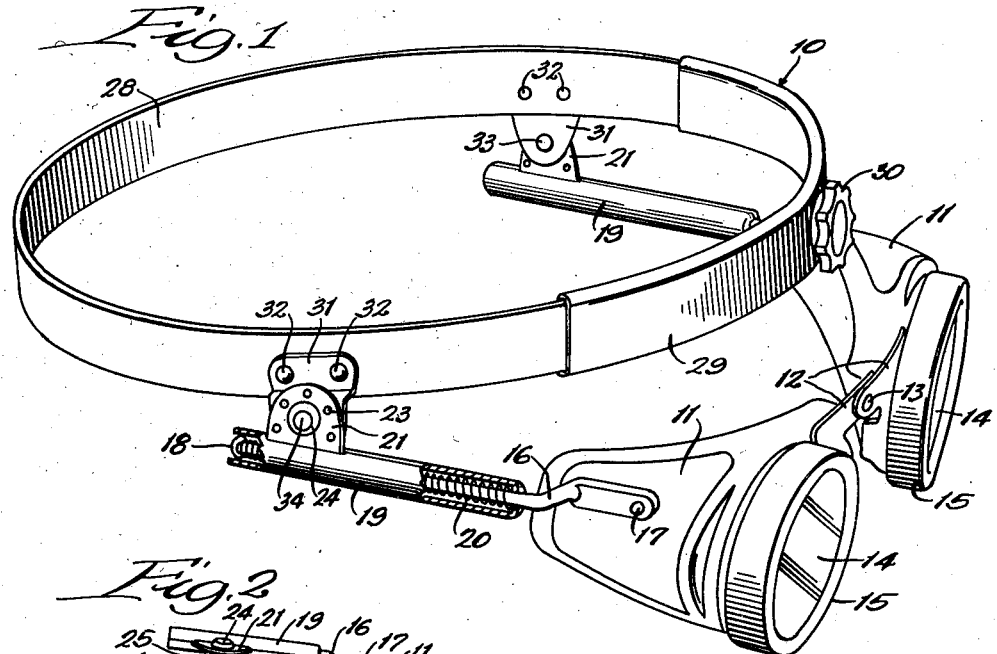
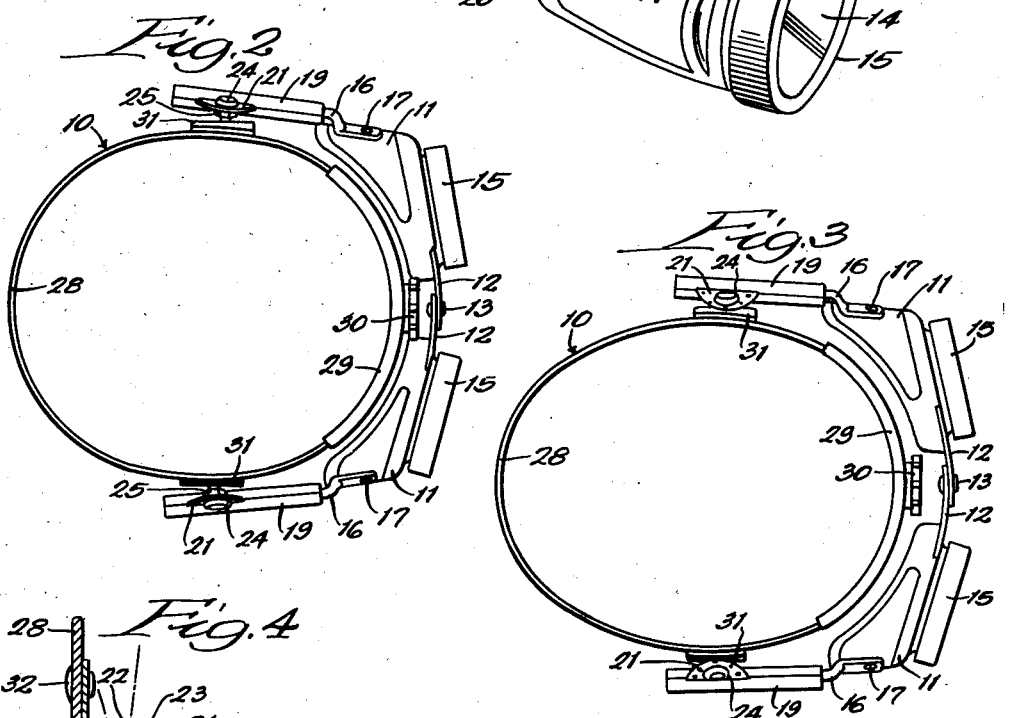
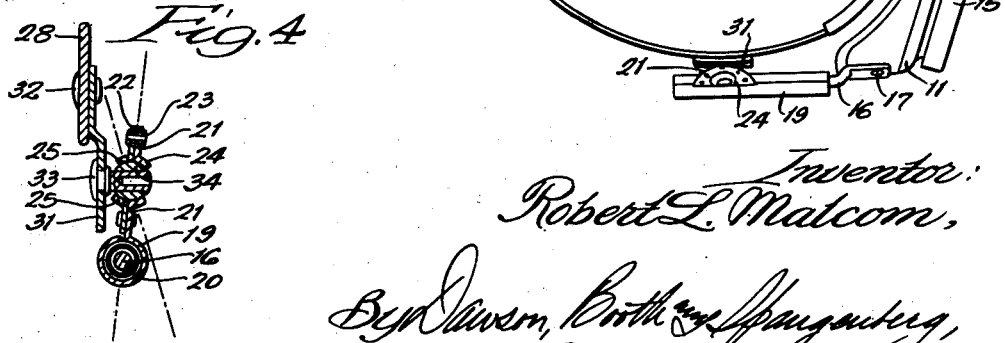
Inventor:
Robert L. Malcom,
By Dawson, Booth and Spangenberg,
Attorneys.

Patented Mar. 28, 1950

2,502,162

UNITED STATES PATENT OFFICE 2,502,162

GOGGLE ASSEMBLY

Robert L. Malcom, Park Ridge, Ill., assignor to Chicago Eye Shield Company, a corporation of Illinois Application June 20, 1947, Serial No. 755,966

5 Claims. (Cl. 2—8)

This invention relates to a goggle assembly which has particular utility in welding operations.

The principal object of this invention is to provide an improved goggle assembly wherein the goggles may be readily, conveniently and rapidly moved with a minimum of effort from the eyes of the wearer to the forehead and back again. Such manipulation of the goggles is extremely beneficial in connection with welding operations where it is desirable to alternately weld and view the welded work.

In carrying out this object of the invention the goggle assembly includes goggles provided with a pair of supporting brackets, a head-band provided with a pair of brackets, and ball and socket joints between the goggle brackets and the head-band brackets to provide for free movement of the goggles with respect to the head-band. The ball and socket joints prevent binding of the brackets upon change in shape of the head-band due to the contour of the head of the wearer, or upon adjustment of an adjustable bridge of the goggles. Where the goggles are provided with extensible supports, the ball and socket joints also provide for free extension and contraction thereof regardless of changes in shape of the head-band due to the contour of the head of the wearer or adjustment of the head-band, or regardless of the adjustment of the bridge of the goggles.

Further objects of this invention reside in the details of construction of the goggle assembly and the cooperative relationship between the component parts thereof.

Other objects and advantages will become apparent to those skilled in the art upon reference to the accompanying specification, claims and drawing, in which:

Fig. 1 is an enlarged perspective view of the goggle assembly;

Fig. 2 is a top plan view of the goggle assembly showing one shape of the head-band;

Fig. 3 is a view similar to Fig. 2 but showing another shape of the head-band; and Fig. 4 is an enlarged sectional view through the ball and socket joint and the associated brackets.

The goggle assembly is generally designated at 10 and includes associated goggles and a head-band. The goggles may comprise lens boxes 11 each provided with a bridge member 12 adjustably secured together by a suitable rivet 13. The relative positions of the lens boxes 11 may, therefore, be adjusted in order to fit the face of the wearer. A lens 14 is carried by each lens box 11 and is held in place by a suitable rim 15. If the goggles are to be utilized for welding operations, the lenses are preferably colored to prevent eye strain resulting from the brilliancy of the welding flame.

Each lens box has a rod 16 rigidly secured thereto by rivets 17 and the extremity of the rod 16 is preferably provided with an enlarged head 18. The rod 20 and head 18 are received in a sleeve 19 and the spring 20 is interposed between the enlarged head 18 and one end of the sleeve 19. The rods 16, sleeves 19, and springs 20 provide extensible supports for the goggles. The springs 20 operate to maintain the goggles snugly against the face of the wearer but at the same time permit manual manipulation of the goggles away from the face of the wearer.

The sleeves 19 of the extensible supports are each provided with a bracket 21 preferably formed integrally with the sleeves 19. Each bracket 21 is provided with a plate 22 which is held in place by rivets 23. The brackets 21 and plates 22 are flared outwardly, as indicated at 24, to form a ball socket. The flared portion of the plate 22 is provided with slits 25 to render the same resilient.

The head-band may be of conventional construction and includes a resilient band 28 having overlapping ends positioned in a resilient sleeve 29. The size of the head-band 28 may be readily adjusted by moving the ends thereof in the sleeve 29 and when the head band 28 is properly adjusted it is clamped in adjusted position by a clamping nut 30. Thus the head-band may be readily adjusted to fit the head of the wearer and because of the flexibility of the head-band it may assume varying shapes, dependent upon the contour of the head of the wearer. In this way the head-band 28 becomes form-fitting and snugly fits the head of the wearer.

A pair of brackets are secured to the head-band 28 by means of rivets 32. Each bracket 31 carries a rivet 33 to which is secured a ball 34 which fits in the ball socket of the brackets 22 formed by the flared portions 24. Thus the goggle brackets 21 may be freely positioned by the ball and socket joints with respect to the head-band brackets 31 and hence with respect to the head-band 28. The slits 25 in the flared portion of the plate 22 cause the socket to snugly and resiliently fit the ball 34 to eliminate looseness in the ball and socket joint.

In using the goggle assembly the head-band 28 is adjusted to fit the head of the wearer and the goggles are adjusted to fit the face of the wearer. When it is desired to remove the goggles from in front of the eyes of the wearer, all that is necessary is to pull them forwardly, which forward movement is permitted by the extensible supports, and to swing them upwardly, which upward movement is permitted by the ball and socket joints. The extensible supports then resiliently hold the goggles on the forehead of the wearer. To replace the goggles in front of the eyes of the wearer, the same operation in reverse sequence takes place.

The ball and socket joints at the brackets 21 and 31 provide for free movement of the brackets with respect to each other without binding, and this is true regardless of the adjustment of the head-band 28, the shape of the head-band which varies with the contour of the head of the wearer, and the adjustment of the goggles. If the ball and socket joints were not present changes in the shape or adjustment of the head-band 28 or in the adjustment of the goggles would result in binding between the brackets 21 and 31 to prevent free and easy movement of the goggles with respect to the head-band. Further, if any binding should occur between the brackets 21 and 31, stresses would be placed on the extensible supports to prevent free sliding movement of the rods 16 with respect to the sleeves 19, but because of the ball and socket joints, binding in the extensible supports is entirely prevented regardless of the shape or adjustment of the head-band 28 or the adjustment of the goggles. Free and easy movement of the extensible supports is thereby provided to permit ready manipulation of the goggles and to permit the springs 20 to maintain the goggles snugly against the face or forehead of the wearer.

Figs. 2 and 3 illustrate different shapes of the head-band 28 resulting from varying contours of the head of the wearer, and illustrate how these variations are compensated for by the ball and socket joints to permit free and easy movement of the goggles with respect to the head-band at all times. Particular attention is directed to the relative positions of the brackets 21 and 31 in Figs. 2 and 3. The dot and dash lines in Fig. 4 show some of the possible positions of the bracket 21 with respect to the bracket 31, which are brought about by the ball and socket joints.

While for purposes of illustration one form of this invention has been disclosed, other forms thereof may become apparent to those skilled in the art upon reference to this disclosure, and, therefore, this invention is to be limited only by the scope of the appended claims and prior art.

I claim as my invention:

1. A goggle assembly comprising, goggles provided with a pair of extensible supports, each having a supporting bracket, a head-band provided with a pair of brackets, and ball and socket joints between the goggle brackets and the head-band brackets to provide for free extension and contraction of the extensible supports and free movement of the goggles with respect to the head-band.

2. A goggle assembly comprising, goggles provided with a pair of extensible supports, each having a supporting bracket, an adjustable head-band provided with a pair of brackets and ball and socket joints between the goggle brackets and the head-band brackets to provide for free extension and contraction of the extensible supports and free movement of the goggles with respect to the head-band regardless of the adjustment of the head-band.

3. A goggle assembly comprising, goggles provided with an adjustable bridge and a pair of extensible supports, each having a supporting bracket, an adjustable head-band provided with a pair of brackets, and ball and socket joints between the goggle brackets and the head-band brackets to provide for free extension and contraction of the extensible supports and free movement of the goggles with respect to the head-band regardless of the adjustments of the head-band and bridge.

4. A goggle assembly comprising, goggles provided with an adjustable bridge and a pair of supporting brackets, a head-band provided with a pair of brackets, and ball and socket joints between the goggle brackets and the head-band brackets to provide for free movement of the goggles with respect to the head-band regardless of the adjustment of the bridge.

5. A goggle assembly comprising, goggles provided with an adjustable bridge and a pair of extensible supports, each having a supporting bracket, a head-band provided with a pair of brackets, and ball and socket joints between the goggle brackets and head-band brackets to provide for free extension and contraction of the extensible supports and free movement of the goggles with respect to the head-band regardless of the adjustment of the bridge.

ROBERT L. MALCOM.

REFERENCES CITED

The following references are of record in the file of this patent:

UNITED STATES PATENTS

| Number | Name | Date |
|---|---|---|
| 1,628,551 | Noyes | May 10, 1927 |
| 1,671,342 | Cantor | May 29, 1928 |
| 2,353,043 | Kraski et al. | July 4, 1944 |